United States Patent Office 3,796,603
Patented Mar. 12, 1974

3,796,603

METHOD OF REMOVING INSOLUBILIZED LIGHT SENSITIZED POLY(VINYL ALCOHOL) FROM A SURFACE UTILIZING PERIODATE IONS

John Ernest Cox, Robert Charles Crafts, John Brendan Houlihan, and Leslie Edward Lawson, Orpington, England, assignors to Howson-Algraphy Limited, Kent, England No Drawing. Filed Jan. 24, 1972, Ser. No. 220,459
Claims priority, application Great Britain, Jan. 25, 1971, 3,122/71
Int. Cl. B08b 7/00
U.S. Cl. 134—42 10 Claims

ABSTRACT OF THE DISCLOSURE

A layer of insolubilized light-sensitized poly(vinyl alcohol)-containing material on a surface such as a printing plate substrate or a silk-screen is treated with an aqueous solution containing periodate ions to facilitate removal of the material from the surface. The surface may be simultaneously or subsequently treated with a bleaching agent. For use in the former case, a pack is provided comprising the aqueous solution containing periodate ions and a separate liquid comprising bleaching agent for mixing together and application to the surface. The surface may be simultaneously or subsequently treated with a lithographic desensitizing material when the surface is a lithographic printing plate substrate. For use in the former case there is provided a liquid comprising the aqueous solution containing periodate ions and a lithographic desensitizing material.

This invention relates to the cleansing of surfaces and is concerned with the removal of insolubilized poly-(vinyl alcohol) layers from surfaces such as printing plate substrates, "silk" screens or surfaces of plant and equipment which have become contaminated with insolubilized poly-(vinyl alcohol) during printing plate manufacturing processes.

The plates or masters used in lithographic printing processes are frequently produced by photographic or photomechanical methods. The platemaker may prefer to use a photographic negative when making the printing plate, or, alternatively, may prefer to use a suitable positive reproduction of the text, pattern, or design to be subsequently printed. In accordance with his choice the platemaker will adopt appropriately different procedures which use specific chemicals and solutions.

Of the different methods of lithographic platemaking which employ positives, there is a group which involves the well known reversal method of processing. In this method, a light-sensitive material based on poly-(vinyl alcohol) is frequently used. Actinic light is caused to act through a positive master onto a coating of the light-sensitive material situated on a metal substrate; this causes a decrease in solubility in the areas of the coating which are struck by light. The more soluble areas of the coating are then selectively removed by a developer, to leave a resist constituted by the insolubilized areas of the coating and the areas of the substrate surface thus revealed are treated (e.g. "deep"-etched and then lacquered) to convert them into a suitable lithographic printing image. Finally, the resist is removed from the substrate and the areas of the substrate thus revealed are then made water accepting to convert them into non-image areas. (Details of such a reversal process are set out in "Offset Lithography," by L. E. Lawson. Vista Books, London, 1963.)

In silk-screen printing processes, a perforated gauze is used to allow ink to pass through it onto the paper below excepting in those areas of the gauze covered by a resist. This resist usually takes the form of an insolubilized poly-(vinyl alcohol) material substantially identical to that used on the lithographic plates described above. The gauzes are expensive and therefore must be cleaned for re-use when a printing run has ended. Although the gauzes may be made from silk, it is more usual today to use a synthetic fibre such as a linear polyamide (nylon) or a linear polyester (terylene).

It is well known that light sensitized poly-(vinyl alcohol) coatings suffer from "dark-hardening" when stored in the absence of light. As a result, the coating becomes insolubilized on storage even though it has not been exposed to light.

Hitherto, the successful removal of light insolubilized (water-insoluble) poly-(vinyl alcohol) coatings in such reversal and silk-screen processes and the successful removal of dark-hardened poly-(vinyl alcohol) coatings have involved messy and hazardous operations. Generally, such removal has involved the application of two chemicals, the first of which is messy by reason of it being a strongly colored solution of permanganate which stains the hands of the platemaker and the second of which is frequently a corrosive acid.

According to one aspect of the present invention there is provided a method of removing from a surface a layer of insolubilized light sensitized poly-(vinyl alcohol)-containing material, which method comprises the step of treating the layer on the surface with a liquid comprising an aqueous solution containing periodate ions prior to removing the layer from the surface.

Treatment with the solution containing periodate ions in accordance with the present invention enables the unwanted layer of insolubilized material to be removed in a particularly efficient manner.

The method of the present invention is particularly useful in the case where the surface from which the insolubilized material is to be removed is a printing plate substrate (e.g. of aluminum, anodized aluminum or a chromium-surfaced multimetal sheet) or the screen used in the silk screen process since it enables the insolubilized material to be removed without damaging the substrate or screen.

The liquid used to treat the plate may also include a sequestering agent to allow tap water to be present without causing precipitation. Moreover, in the case of lithographic printing plate manufacture, the liquid may include a lithographic desensitizing material. Such materials are known per se.

In accordance with one embodiment of the method of the present invention, a clear, dilute, colorless solution containing periodate ions is substituted for the conventional 5 or 6% aqueous permanganate solution and thereafter the surface may optionally be treated with a clear, dilute, colorless solution of a bleaching agent, such as sodium hypochlorite, to remove residual color. Alternatively, the method of the present invention may be carried out using a single clear colorless composite solution which contains periodate ions and bleaching agent.

Accordingly, a further aspect of the present invention provides a composition for use in facilitating the removal of a layer of insolubilized light-sensitized poly-(vinyl alcohol)-containing material from a surface, said composition comprising a source of periodate ions and a bleaching agent.

In the case where the source of periodate ions in the composition is an aqueous solution containing such ions and/or the case where the bleaching agent in the composition is a liquid bleaching agent, the composition should be used within about 48 hours of its preparation, since such a composition is not storage stable. In such a case, the composition may be supplied as a pack in which the source of periodate ions and the bleaching agent are kept separate. The pack may be of any conventional type used for marketing two components for subsequent admixture before use. Thus, for example, the pack may comprise a suitable box containing the source of periodate ions and the bleaching agent in separate glass containers. In an alternative embodiment of this aspect of the invention, the source of periodate ions in the composition may be a solid salt, e.g. sodium periodate and the bleaching agent in the composition may be a solid bleaching agent (e.g., chlorinated cyanuric acid). In this case, the composition needs to be admixed with water before being used in the removal of the insolubilized material.

In accordance with this further aspect of the present invention, the composition may also include a suitable sequestering agent, e.g. a phosphate such as sodium tri-poly-phosphate, to allow tap water to be present without causing precipitation. Further, in the case of lithographic printing plate manufacture, the presence of such a phosphate provides a useful degree of desensitization of the surface from which the layer is to be removed. If desired, other suitable densensitizing materials which are known per se may be used.

According to another aspect of the present invention there is provided a liquid, for use in treating a layer of insolubilized light-sensitized poly-(vinyl alcohol)-containing material on a surface prior to removal of the material from the surface in lithographic printing plate manufacture, which liquid comprises a lithographic desensitizing material and an aqueous solution containing periodate ions.

If desired, of course, the desensitization may be carried out in a separate step by applying the desensitizing material after treatment with the periodate ion-containing solution and removal of the insolubilized layer.

By removing insolubilized material in accordance with the present invention, it is possible to dispense with the conventional treatment with acid. The elimination of the acidic solution is particularly advantageous during lithographic printing plate manufacture because it avoids unnecessary deterioration of the image areas and the substrate surface thereby prolonging the useful life of the resultant printing plate and permitting the elimination of the conventional inking operation which normally has to follow the application of the lacquer after "deep"-etching.

Although other liquids have been used to remove the insolubilized material, none has proved to be as advantageous and efficient as periodate ion-containing solutions. In this connection, it will be appreciated that when removing the insolubilized material it is not desirable to use cleansing liquids which significantly attack or dissolve the surface carrying the layer. This is particularly important when lithographic printing plate are being manufactured and the surface is of aluminum or anodized aluminum (aluminum oxide). Also, it is not acceptable to use cleansing methods which require prolonged treatment or immersion of the surface at ambient temperatures or which require the use of elevated temperatures. For instance, it has been found that although a saturated solution of sodium peroxide would remove the insolubilized material, a treatment time of 20 minutes was required at 22° C. Removal was more rapid at 60° C. Sodium hydroxide behaved in a similar manner as did ammonium hydroxide and hot sodium carbonate solutions.

In accordance with the present invention the solution containing periodate ions may be a potassium periodate solution. Such a solution may be a clear 0.4% w./v. solution which can be obtained by dissolving potassium periodate in distilled water at room temperatures. Alternatively, the solution may be a sodium periodate solution. Such a solution may be a clear 5% w./v. solution which can be obtained by dissolving sodium metaperiodate in distilled water at 20° C. In a further alternative, the source of periodate ions in the solution may be periodic acid. If tap water is used to make up these solutions the inclusion of, for example, ethylenediamine tetracetic acid (E.D.T.A.) is beneficial in preventing precipitation.

Although the present invention is particularly useful in the production of lithographic printing plates from one or more positives it is applicable to the removal of insolubilized poly-(vinyl alcohol) material from the surface of printing plates and silk screens in general without damaging them and it is possible that the insolubilized poly-(vinyl alcohol) material may have been created by using one or more negatives as starting point. For instance, the insolubilized poly-(vinyl alcohol) material may have been produced on the surface via a negative to form a resist for line or halftone process engraving by the powderless etching technique or it may take the form of a resist or "stencil" on a suitable mesh or gauze suitable for screen-process printing. Further, the insolubilized material may be in the form of a contaminant on the surface of plant and equipment or in the form of a layer which has become dark-hardened due to storage.

Layers of insolubilized material containing substances in addition to light-sensitized poly-(vinyl alcohol) may be removed from surfaces in accordance with the present invention. For example, the layers may contain added polymers, either natural or synthetic, for example dextrine or acrylamide polymers and/or suitable plasticizers and/or colourants which do not interfere with the function of the essential constituent of the layer. Also the layers may have been further insolubilized by suitable subsequent treatment.

The following examples illustrate the invention.

EXAMPLE 1

A finely marble grained aluminum lithographic sheet was cleaned with 5% (aqueous) solution of acetic acid, then well washed and immediately coated with Alcopoly "A65" coating solution sold by Howson-Algraphy S.p.A. of Milan. The essential constituents of this light-sensitive solution are poly-(vinyl alcohol) and ammonium dichromate. A rotating turntable revolving at 110 r.p.m. enabled a satisfactory, thin layer to be obtained. When dry, the light sensitive layer on the sheet was exposed for 4 minutes whilst in contact with a 133 screen halftone positive to the light emitted by a 30 ampere open carbon arc source. The exposed plate was then taken to a sink, flooded with clean running water and the whole of the coating was rubbed gently with a pad of wet cotton wool until it was judged that the non-light-struck areas of the coating had been removed leaving a layer of insolubilized coating in the areas struck by light. The resultant developed plate was then dried rapidly on the turntable. The apparently clean areas of the aluminum surface revealed on development were then "deep"-etched in the customary manner for three minutes using Howson-Algraphy S.p.A. "Aluminum deep-etch Solution" which contains hydrochloric acid, after which the plate was again thoroughly washed with water and dried.

The actual printing image was then created by applying to the etched plate a thin layer of Howson-Algraphy S.p.A. "laca-de-base" and drying same. A thin layer of greasy black ink was then applied and dried. The plate was placed under cold running water. After approximately one minute the excess ink, lacquer and water were rubbed off and the plate was flooded with the following freshly made solution:

| | | |
|---|---|---|
| Potassium metaperiodate | g | 0.4 |
| Sodium tri-poly-phosphate | g | 0.4 |
| Water up to | ml | 100 |

Two minutes later the plate was scrubbed with a bristle brush to remove the layer of insolubilized coating. To ensure adequate removal, a further application of the above periodate solution was carried out and the scrubbing repeated. Thorough washing followed by the usual desensitizing operation using phosphoric acid and gum arabic solution was found to produce a lithographic plate having non-printing areas (constituted by the aluminum surface revealed when the insolubilized coating was removed) which did not accept oleo-ink when kept moist in the usual manner.

EXAMPLE 2

A grained and anodized aluminum sheet was coated with orange colored "Poroplas" coating solution supplied by Howson-Algraphy N.V. This is a solution of light sensitized poly-(vinyl alcohol). After drying the coating was exposed to actinic light whilst in intimate contact with a photographic line positive. The exposed coating was developed with water selectively to remove the non-light-struck areas and then dried before the aluminum surface revealed on development was "deep"-etched with "AL4" solution for 2 minutes. This solution contains hydrochloric acid and is supplied by Howson-Algraphy Limited. The etched plate was then thoroughly washed under running water and dried again. A printing image was formed in the etched aluminum surface by drying down a thin layer of a lacquer known as Patralac (Printing Industry Research Association, Leatherhead, Surrey). A thin coating of greasy black ink was then applied on top of the lacquer. After a brief immersion in clean water, the plate was thoroughly wetted with an aqueous solution containing 0.35% potassium meta periodate and 0.35% of sodium tri-poly-phosphate which had been made in a similar manner to that described in Example 1. Two minutes later the stencil, constiuted by the insolubilized light struck areas of the coating, was removed by scrubbing under running water with a bristle brush. To complete the plate the non-printing areas revealed when the insolubilized coating as been removed were bleached and desensitized by applying a 1½% solution of sodium hypochlorite in tap water containing 1½% of sodium tri-poly-phosphate. When re-washed, and gummed with a 5% solution of sodium carboxymethyl cellulose, the plate was placed on a lithographic printing machine and found to behave normally.

EXAMPLE 3

A grained and anodized aluminum sheet was coated with dye-containing Alcopoly "A65" solution at 90 r.p.m. in a rotating whirler. When dry, the sheet was removed and exposed beneath a line positive for 3¼ minutes in a contact frame 4 feet away from a 30-ampere open arc carbon lamp. The exposed coating was developed by washing with water and rubbing with clean cotton wool, after which the plate was dried rapidly in the whirler. The areas of the aluminum sheet revealed on development were then deep-etched for 3 minutes with "AL4" deep-etch solution and the etched plate was well washed with clean water and dried. Deep-etch lacquer "NL 65" (Howson-Algraphy Ltd.) was applied as a thin film, dried and the plate was inked in the normal manner. The residual stencil constituted by the light insolubilized poly-(vinyl alcohol) coating was wetted with water and then flooded with a 5% w./v./solution of sodium meta-periodate in water containing 2% E.D.T.A.

After one minute the plate was scrubbed to remove the insolubilized coating and rinsed, and it was found that the non-printing areas, constituted by the aluminum surface revealed on removal of the insolubilized coating, were stained blue. Normal treatment with phosphoric/gum etch to desensitize these areas failed to remove the blue stain. However, this was found to be unimportant as when the plate was inked in the customary manner while moistened with water, it was observed that the non-printing areas were normally hydrophilic, which indicated that the treatment with periodate solution had resulted in removal of the insolubilized coating. Subsequent treatment with dilute sodium hypochlorite and then with phosphoric/gum etch bleached and fully desensitized the non-printing areas. The plate was then gummed with a 20% solution of gum arabic in the normal manner and judged ready for printing.

EXAMPLE 4

A grained and gum-sealed anodized "AS5" aluminum sheet, as produced by Howson-Algraphy Limited, was removed from its wrappings, washed and wiped under clean water, and coated with ready sensitized "K4" coating solution as sold by W. Krause of Bielefeld, Germany. This solution is a solution of light sensitized poly-(vinyl alcohol) containing a red dye. After six minutes in the whirler at 100 r.p.m., the coated sheet was removed and placed in a vacuum contact frame behind an assembly of line and halftone positives in intimate contact therewith. The coating was exposed to a 50 ampere carbon arc light source for three minutes. The exposed plate was developed and deep etched as described in the previous example with the difference that "deep"-etching was effected for four minutes. The printing image was formed by drying down a thin layer of Howson-Algraphy "Tuflac" followed by an application of black "inking-in solution" of Howson-Algraphy Limited. The processing of the plate was then completed in a manner similar to that described in the previous example except that the sodium metaperiodate solution was replaced by approximately 500 ml. of a freshly made solution comprising:

| | | |
|---|---|---|
| Potassium metaperiodate | g | 0.4 |
| Sodium tri-poly-phosphate | g | 0.4 |
| Sodium hypochlorite (12–14% av. chlorine | ml | 0.2 |
| Tap water up to | ml | 100 |

(The pH of this solution was recorded as 7.9 when the solution was several days old.) The plate was treated with the above freshly made solution for about 2 minutes. After rinsing and then desensitizing with a solution of gum arabic containing phosphoric acid, the resultant plate was fastened to a small offset printing machine and the non-printing areas found to possess excellent non-ink accepting qualities.

EXAMPLE 5

The method described in the previous example was repeated using a different brand of light sensitive poly-(vinyl alcohol) coating solution. This was a blue to blue-green colored solution known as "Realith" marketed by Bauer of Vienna. The final plate although slightly blue in color was found to possess not only a good printing image but also good hydrophilic non-printing areas, which indicated that the insolubilized coating had been satisfactorily removed even though the conventional potassium permanganate treatment had been dispensed with.

EXAMPLE 6

A grained and anodized sheet of aluminum was washed and coated with the Alcopoly "A65" poly-(vinyl alcohol) coating as used in Example 1. It was then exposed, processed, and finished in the manner of Example 4. A satisfactory printing plate was obtained. When inked in the customary manner, while adequately moistened with ordinary tap water, the plate showed no signs of scumming or toning of the non-printing areas.

EXAMPLE 7

A trimetal sheet comprising a chromium outer layer and a copper intermediate layer and supplied by Coates Brothers (Litho Plates) Ltd., under the designation Nu-chrome was cleaned with dilute hydrochloric acid, washed and coated in a whirler rotating at approximately 100 r.p.m. with Alcopoly "A65" coating solution, as supplied by Howson-Algraphy S.p.A. When dry, it was exposed and developed as in the previous example, after which the remaining light insolubilized coating was further hardened by means of "Tanante" solution supplied by Howson-Algraphy S.p.A. After rinsing and drying, a suitable chromium etch was applied until the chromium surface revealed on development had been dissolved away to reveal the underlying copper layer. The plate was then well washed. The hardened poly-(vinyl alcohol) stencil was readily removed by soaking and scrubbing in the manner described in Example 4 using the periodate solution described in that example.

EXAMPLE 8

The turntable of a large horizontal whirler had been badly contaminated with residual light insolubilized poly-(vinyl alcohol) coating solutions. It was badly stained and covered with various amounts of the insoluble material. About 100 ml. of the periodate solution as used in Example 4 was poured onto one-quarter of the turntable and spread with a brush. After two minutes, further solution was added and the area scrubbed gently. After a short while the treated area was washed with clean water and it was found that almost all of the insoluble material had been removed.

EXAMPLE 9

A printing stencil was made using fine nylon mesh (Nital, E. T., Marler Ltd., London). This gauze was mounted under tension on the usual frame and the stencil formed by applying a layer of light-sensitized poly-(vinyl alcohol) material (Chromdite indirect-direct material supplied by the above company), following which the layer was exposed to a carbon arc light while in contact with a line positive rendering of a pattern. Development to remove the unexposed areas of the layer was carried out with water and the stencil then dried.

Using the stencil the design was printed by the normal screen process method using a black pigmented oleo-ink, after which the stencil was removed so as to make the gauze ready for re-use.

This cleaning was carried out by first removing the ink with white spirit and then soaking the stencil in a 2.8% aqueous solution of sodium metaperiodate in distilled water. An immersion of 1½ minutes followed by a gentle scrub with a soft bristled brush was found to completely remove the stencil without damage to the mesh, and it was cleaned ready for re-use after being rinsed with water.

EXAMPLE 10

Example 9 was repeated using a 3% solution of metaperiodic acid instead of 2.8% sodium metaperiodate. Similar results were obtained.

EXAMPLE 11

A screen formed for the polyester known as Terylene (trademark) which had been used for demonstration of the silk-screen printing process over a period of several months and upon which the poly-(vinyl alcohol) resist had therefore become very hard, was treated in a manner similar to that described in Example 9 using a 3.5% aqueous solution of sodium metaperiodate. The screen was readily cleaned thereby.

In the above examples, metaperiodic acid, is taken as $HIO_4 \cdot 2H_2O$, which is more correctly known as peraperiodic acid, and sodium and potassium metaperiodate are taken as $NaIO_4$ and $KIO_4$ respectively. Other salts and acids may be used as sources of periodate ions due regard being paid to adequate solubility in water. More concentrated solutions have a more rapid cleansing action than those of low concentration and are therefore desirable in those cases where a heavy layer has to be removed.

EXAMPLE 12

A grained and anodized aluminum litho plate base, sold by Howson-Algraphy Ltd. under the code AS5, was wetted with tap water and whirler coated with a thin layer of polyvinyl alcohol light-sensitive coating solution sold by Howson-Algraphy Ltd. under the designation A65. of the image was carried out using AL4 solution (Howson-tive in the usual way and developed with water aided by gentle rubbing with a pad of cotton wool. The plate and the stencil thereon were then dried and "deep-etching" of the image was carried out using AL4 solution (Howson-Algraphy Ltd.) for 2½ minutes followed by a water-wash and drying. The printing image was formed by applying a thin layer of conventional lacquer based on Vinylite (trademark) resin, drying with warm air, and covering with black oleo-ink.

Several weeks previously, a dry mixture of 4 g. of potassium periodate and 20 g. of FI-CHLOR 60's, a bleaching agent of Fisons Ltd. and believed to be sodium di-chloroisocyanurate, had been prepared and stored in a glass jar. To remove the stencil from the inked plate prepared above, the dry mixture was dissolved in 1 liter of demineralized water and the resultant solution was poured over the plate. Within a few seconds, the blue color had disappeared and after 2 minutes the stencil was removed. The printing plate was desensitized and used in the normal manner.

We claim:

1. A method of removing from a surface a layer of light-sensitized poly-(vinyl alcohol)-containing material which has been insolubilized, which method comprises the step of treating the layer on the surface with a liquid comprising an aqueous solution containing periodate ions prior to removing the layer from the surface.

2. A method according to claim 1, wherein said solution comprises sodium periodate as the source of periodate ions.

3. A method according to claim 1, wherein said solution comprises potassium periodate as source of periodate ions.

4. A method according to claim 1, wherein said solution comprises periodic acid as source of periodate ions.

5. A method according to claim 1 and comprising the additional step of treating the surface with a bleaching agent after the treatment with said solution.

6. A method according to claim 5, wherein the bleaching agent is sodium hypochlorite.

7. A method according to claim 1, wherein said solution includes a lithographic desensitizing material.

8. A method according to claim 1, wherein said solution includes a sequestering agent to prevent precipitation in the presence of tap water.

9. A composition for use in facilitating the removal from a surface of a layer of light-sensitized poly-(vinyl alcohol)-containing material which has been insolubilized, said composition comprising a source of periodate ions and a bleaching agent.

10. A liquid for use in pretreating a layer of light-sensitized poly-(vinyl alcohol)-containing material which has been insolubilized to facilitate removal of the material from a surface in lithographic printing plate manufacture, which liquid comprises a lithographic densitizing material and an aqueous solution containing periodate ions.

References Cited

UNITED STATES PATENTS 3,124,562 3/1964 Naito et al. ______ 260—91.3 PV

OTHER REFERENCES

Fettes, Chemical Reactions of Polymers, vol. XIX, p. 35 (1964) Posl-QD, 281. P6, F47.

Hartsuch, Chemistry of Lithography, Lithographic Tech. Foundation Inc., N.Y. (1961), pp. 123–124, 60–61.

Schwartz et al., Surface Active Agents, Interscience Publishers, New York (1949), pp. 375–376, Posl-TP, 419.53, c. 7.

MORRIS O. WOLK, Primary Examiner

T. W. HAGAN, Assistant Examiner

U.S. Cl. X.R.

134—2, 26; 252—186; 101—1